(No Model.)

G. LAUBE.
STOVE PIPE THIMBLE.

No. 300,486. Patented June 17, 1884.

WITNESSES:

INVENTOR:
G. Laube
BY Munn & Co.
ATTORNEYS.

UNITED STATES PATENT OFFICE.

GODFRIED LAUBE, OF HURON, DAKOTA TERRITORY.

STOVE-PIPE THIMBLE.

SPECIFICATION forming part of Letters Patent No. 300,486, dated June 17, 1884.

Application filed November 5, 1883. (No model.)

*To all whom it may concern:*

Be it known that I, GODFRIED LAUBE, of Huron, in the county of Beadle and Territory of Dakota, have invented a new and Improved Stove-Pipe Thimble, of which the following is a full, clear, and exact description.

My invention consists of a thimble having a flaring outer end of sufficient size to admit the bead of the stove-pipe to be inserted a suitable distance for being secured by screws screwing obliquely through the outer end of the thimble against the bead, the said outer end of the thimble being made of sufficiently thick and substantial material to hold the screws, all as hereinafter fully described.

Reference is to be had to the accompanying drawings, forming part of this specification, in which similar letters of reference indicate corresponding parts in both the figures.

Figure 1:
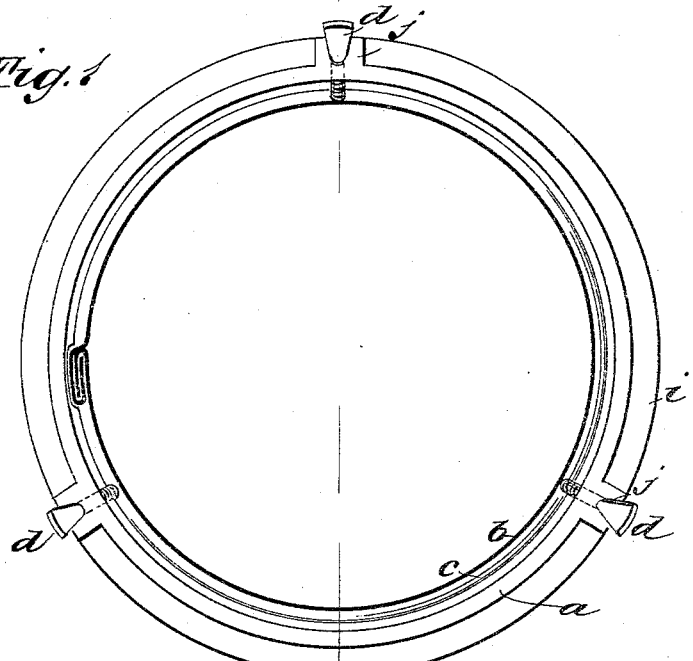
Figure 2:
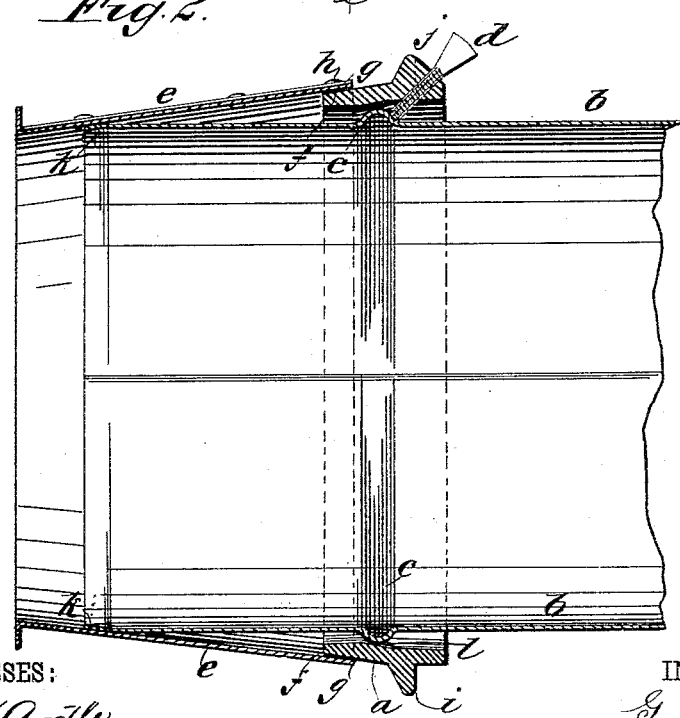

Figure 1 is an end elevation of my improved thimble with a section of stove-pipe fastened in it, and Fig. 2 is a section of Fig. 1 on the line $x\ x$.

I make the outer end portion, $a$, of the thimble sufficiently flaring to enable the stove-pipe section $b$ to enter, so that the bead $c$ will pass in far enough to be secured by two or more set-screws, $d$, screwing obliquely through said outer part, $a$, of the thimble against the bend $c$, to secure it firmly and wedge it in tightly. In this case the part $a$ of the thimble consists of a taper cast-metal ring, and the inner part, $e$, consists of a taper sheet-metal ring. In this case the smaller end, $f$, of the cast-iron ring $a$ enters the larger end, $g$, of the sheet-metal ring $e$, and the two are fastened together by rivets $h$, and the cast-iron ring is made with a collar, $i$, to bear against the outer face of the chimney-wall; and when the holes are to be made for the screws $d$ the angle between the collar $i$ and the outer end of the flange is filled with metal, making faces $j$ square to the pitch of the screws, to facilitate the boring and tapping for them and to increase the thickness of the metal for substantial support to the screws. The taper of the thimble is such that the end of the pipe $b$ comes to a bearing near the inner end of the thimble at $k$ when the bead comes to its bearing at $l$ in the cast-iron ring, so that the two points of contact afford substantial connection, by which the thimble and pipe-section are more permanently secured than if they had contact at the bead only. The ring $a$ also has a taper contraction at $l$ on the inner surface, to bring the bead $c$ to a bearing in suitable relation to the position of the screws $d$, that they may have their bearing directly on the side of the bead.

Having thus described my invention, what I claim as new, and desire to secure by Letters Patent, is—

1. A tapering stove-pipe thimble provided at its forward end with inclined set-screws passing into the interior of the said thimble, whereby the end of a stove-pipe may abut against the tapering inner portion of the thimble and be securely held in position by the set-screws bearing on its annular bead, substantially as set forth.

2. The combination of the flaring ring $a$, formed with an annular contraction or shoulder, $l$, on its inner surface, and the inclined screws $d$, passing through the ring to a position in front of said contraction or shoulder, with the section $e$ secured to the inner edge of the ring $a$ and contracting toward its rear end, whereby the end of a stove-pipe may obtain a bearing in said section, as at $k$, and its bead be clamped between the shoulder $l$ and the set-screws, substantially as set forth.

GODFRIED LAUBE.

Witnesses:
SIMMIE GOMBAR,
DAVID GOMBAR.